United States Patent Office 3,225,062
Patented Dec. 21, 1965

3,225,062
PROCESS FOR 1,2-DITHIOLE-3-THIONES
Erwin Klingsberg, Mountainside, N.J., assignor to American Cyanamid Company, Stamford, Conn., a corporation of Maine
No Drawing. Filed Feb. 11, 1963, Ser. No. 257,747
5 Claims. (Cl. 260—327)

This invention relates to a new process for the preparation of 1,2-dithiole-3-thiones (hereinafter referred to as "trithiones") and to new trithiones produced thereby.

More especially, it relates to the discovery that 1,2-dithiole-3-thiones can be obtained by the reaction of 1,2-dithiolium salts with sulfur, as illustrated by the following equation:

$$R_1-\underset{S-S}{\overset{R_2}{\underset{1+2}{\overset{4}{\underset{5\ 3}{\big|}}}}}-H \quad X^- + S \longrightarrow R_1-\underset{S-S}{\overset{R}{\underset{1\ 2}{\overset{4}{\underset{5\ 3}{\big|}}}}}=S + HX$$

wherein $X^-$ is the anion of a strong acid (e.g., halide, thiocyanate, perchlorate, hydrogen sulfate and the like) and $R_1$ and $R_2$ are either hydrogen, phenyl, nitrophenyl or N,N-di-lower alkylaminophenyl, at least one of the $R_1$ and $R_2$ radicals being hydrogen.

This process of this invention is particularly valuable for the preparation of 4- or 5-nitrophenyltrithiones. These are unobtainable by previously known methods, and, as new compounds, they constitute another aspect of the present invention.

The reaction of a 1,2-dithiolium salt with an essentially stoichiometrical amount of sulfur gives nearly quantitative yields to the corresponding 1,2-dithiole-3-thione. Reaction is conveniently carried out under weakly basic conditions, employing an amine such as pyridine or a picoline. The reaction occurs even at room temperature, but heating is advantageous, and the reaction goes quickly and smoothly at reflux temperatures. The product is readily isolated by dilution with water or dilute acid.

Necessary sulfur is provided either by addition of elemental sulfur to the dithiolium starting material, or else by thermal decomposition of a part of the dithiolium salt. In the latter case, the yield of trithione, based on the dithiolium salt, is somewhat reduced.

The basic medium may be a weak base which is also a solvent for the reactants, e.g., pyridine or one of its lower homologs.

The nitrophenyl 1,2-dithiole-3-thiones of this invention are useful in the preparation of new azo dyestuffs. The nitro group may be reduced to an amino group by conventional means to give the corresponding aminophenyl compounds which, in turn, may be diazotized and coupled with arylamines, phenols or naphthols or ketomethylene coupling components to give monoazo dyestuffs which are useful for coloring polyacrylonitrile and other synthetic fibers.

The starting materials used in the process of this invention are disclosed in copending applications: Serial No. 27,254, filed May 6, 1960, now abandoned; and Serial No. 70,146, filed November 18, 1960, having matured to U.S. Patent No. 3,120,543.

The following examples illustrate the invention.

EXAMPLE 1

*4-(p-nitrophenyl)-1,2-dithiole-3-thione*

One gram of 4-(p-nitrophenyl)-1,2-dithiolium hydrogen sulfate (prepared as in Example 3 of copending application, Serial No. 27,254, omitting the reaction with potassium bromide) and 0.10 gram of sulfur are warmed in 5 ml. of pyridine on a steam bath for fifteen minutes. The deep red solution is cooled and diluted with water. The yield of yellow solid (M.P., 160–167° C.) is 0.77 g. It is crystallized from xylene to give pure product melting at 176–178.5° C.

EXAMPLE 2

*4-phenyl-1,2-dithiole-3-thione*

0.32 gram of sulfur is dissolved in 40 ml. pyridine with heating of 2.0 g. of 4-phenyl-1,2,dithiolium hydrogen sulfate added. (The latter may be prepared by the method of Example 1 of copending patent application, Serial No. 27,254.) The mixture is refluxed a half hour, cooled and poured into water. The 4-phenyl-1,2,dithiole-3-thione precipitates. It is collected and recrystallized from methylcyclohexane.

EXAMPLE 3

*4-phenyl-1,2-dithiole-3-thione*

A solution of 1.30 g. of 4-phenyl-1,2-dithiolium bromide and 0.20 g. of sulfur in 40 ml. of pyridine is refluxed one-half hour. It is cooled, diluted with dilute hydrochloric acid solution, filtered and dried to give 0.95 g. of 4-phenyl-1,2-dithiole-3-thione, M.P., 102–110° C. Crystallization from methylcyclohexane raises the M.P. to 121.5–123° C.

When the sulfur is omitted, the same product is obtained in a smaller yield.

EXAMPLE 4

*5-phenyl-1,2-dithiole-3-thione*

0.32 gram of sulfur is dissolved in 40 ml. hot pyridine and 2.14 g. of 3-phenyl-1,2-dithiolium iodide (prepared by the method of Example 2 of copending application, Serial No. 27,254) are added. The mixture is refluxed for thirty minutes, cooled and poured into water. After stirring and standing, it is separated and dried. On recrystallization from 30 ml. methanol using activated charcoal and cooling in a Dry-Ice-acetone bath, the product is obtained.

EXAMPLE 5

*5-(p-nitrophenyl)-1,2-dithiole-3-thione*

One gram of 3-(p-nitrophenyl)-1,2-dithiolium bromide (prepared as in Example 4 of copending application, Serial No. 27,254) and 0.11 g. of sulfur are warmed in 6 ml. of pyridine for twenty minutes on the steam bath. The dark brown solution is cooled and diluted with water. The pure product is obtained by recrystallization from methylcyclohexane (M.P., 156–161° C.).

EXAMPLE 6

*5-(p-dimethylaminophenyl)-1,2-dithiole-3-thione*

$$\underset{CH_3}{\overset{CH_3}{\diagdown}}N-\underset{}{\bigcirc}-\underset{S-S}{\overset{}{\big|}}=S$$

A solution of 1.59 g. of 3-(p-dimethylaminophenyl)-1,2-dithiolium hydrogen sulfate and 0.2 g. of sulfur in 40 ml. of pyridine is refluxed a half hour, then cooled and diluted with 5 N hydrochloric acid. The 5-(p-dimethylaminophenyl)-1,2-dithiole-3-thione is filtered, dried and recrystallized from n-butyl acetate. It has a M.P. of 209–211° C.

I claim:
1. A process of preparing a 1,2-dithiole-3-thione of the formula:

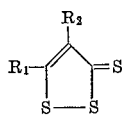

wherein $R_1$ and $R_2$ are individually selected from the group consisting of hydrogen, phenyl, nitrophenyl and N,N-di-lower alkylaminophenyl, at least one of the $R_1$ and $R_2$ radicals being hydrogen, which comprises heating a weakly basic solution of a dithiolium salt of the formula:

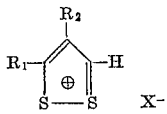

wherein $R_1$ and $R_2$ are defined as above and $X^-$ is an anion, in the presence of sulfur.

2. The process of claim 1 wherein the dithiolium salt is dissolved in pyridine.
3. The process of claim 1 wherein heating is at reflux temperature.
4. The process of claim 1 wherein sulfur is present in the weakly basic solution prior to heating.
5. The process of claim 1 wherein sulfur is formed by decomposition of a part of the dithiolium starting material.

References Cited by the Examiner

UNITED STATES PATENTS 2,653,910  9/1953  Airs et al. _____ 260—327 X
3,110,718  11/1963  Thullier et al. _____ 260—327

OTHER REFERENCES

Kharasch: Organic Sulfur Compounds, pp. 445 and 452 (Pergamon Press, New York, 1961).

Klingsberg: Jour. Amer. Chem. Soc., vol. 83 (1961), pp. 2934–2937.

WALTER A. MODANCE, *Primary Examiner.*
NICHOLAS S. RIZZO, *Examiner.*

UNITED STATES PATENT OFFICE
CERTIFICATE OF CORRECTION

Patent No. 3,225,062            December 21, 1965

Erwin Klingsberg

It is hereby certified that error appears in the above numbered patent requiring correction and that the said Letters Patent should read as corrected below.

Column 2, line 6, for "-1785 C." read -- -178° C. --; line 11, for "of", first occurrence, read -- and --; line 15, for "4-phenyl-1,2,dithiole" read -- 4-phenyl-1,2-dithiole --.

Signed and sealed this 18th day of October 1966.

(SEAL)
Attest:

ERNEST W. SWIDER
Attesting Officer

EDWARD J. BRENNER
Commissioner of Patents